Patented Apr. 16, 1946

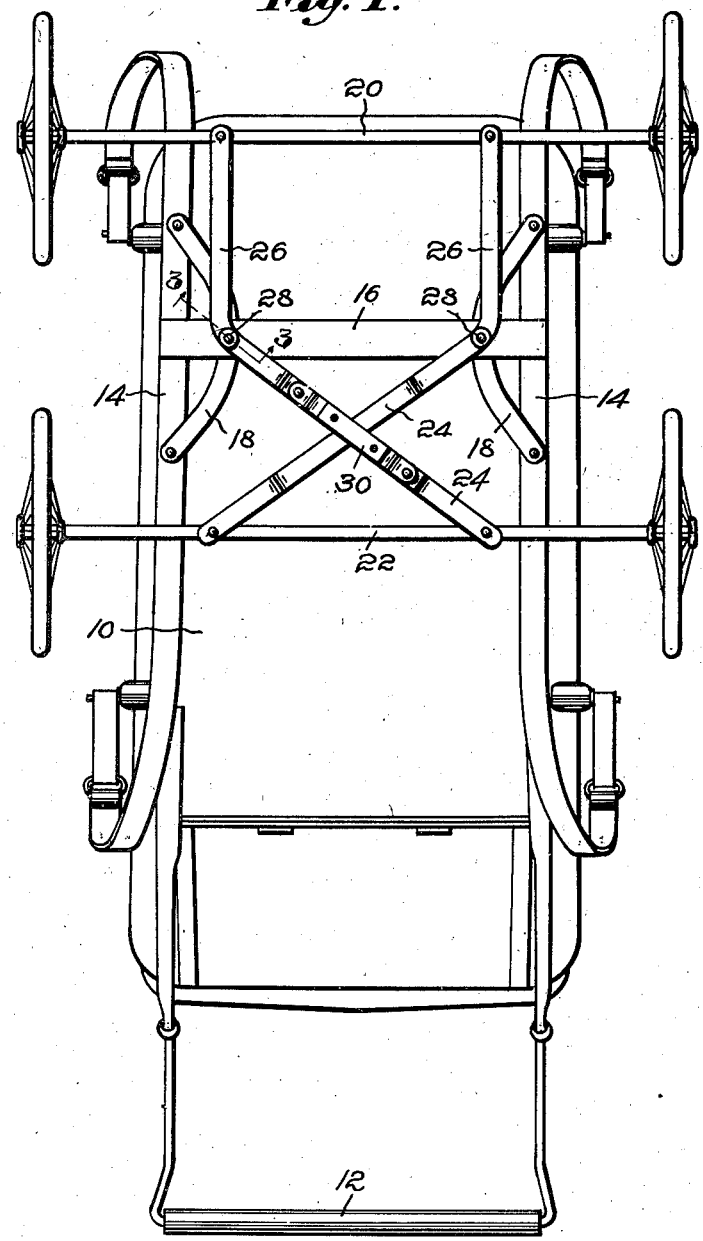

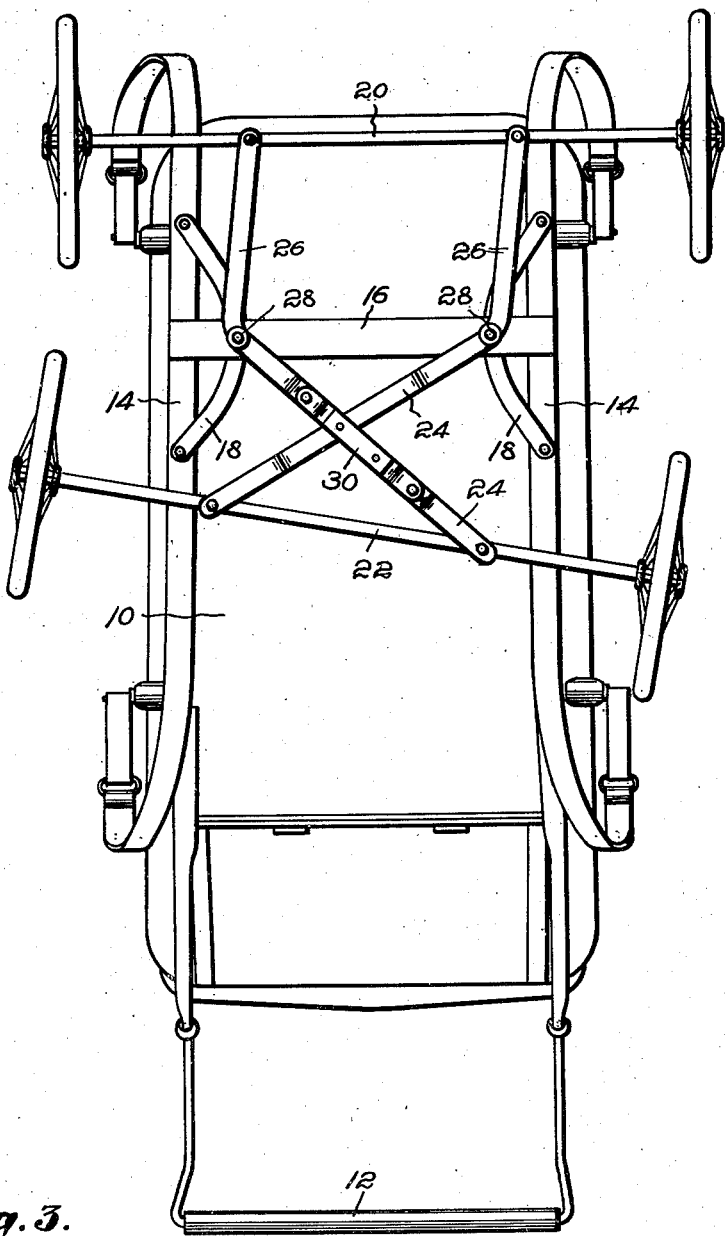
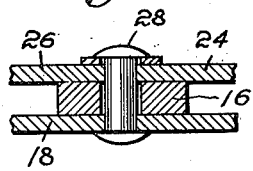

2,398,650

UNITED STATES PATENT OFFICE 2,398,650

STEERING BABY CARRIAGE

Edouard Lachance, Leominster, Mass., assignor to F. A. Whitney Carriage Company, Leominster, Mass., a corporation of Massachusetts Application February 28, 1945, Serial No. 580,193

4 Claims. (Cl. 280—48)

This invention relates to steerable baby carriages and the object is to provide a carriage wherein the body and non-rotatable wheeled axles are connected for support of the former from the latter at both sides of the center line and the parts are correlated to effect a steering movement of at least one of the axles when pressure is exerted on the body to start a turn, this correlation being such as to provide a superior tracking relation between the pairs of wheels.

My invention will be well understood by reference to the following description of the illustrative embodiment thereof shown by way of example in the accompanying drawings, wherein:

Fig. 1 is a bottom plan view of the carriage showing the running gear in position for straight-ahead movement;

Fig. 2 is a view similar to Fig. 1 showing the parts in the position they assume in making a turn in a direction downwardly at the left in the figure; and Fig. 3 is an enlarged section on the line 3—3 of Fig. 1.

The carriage may have a body 10 of any suitable form which may have a pusher bar 12 directly connected thereto. The body is hung from the ends of longitudinal springs 14 at the sides thereof, which springs may be considered as part of an underframe comprising the centrally disposed member 16 extending transversely beneath the body and herein shown as connected to the springs directly at its ends and by means of arcuate braces 18. At the ends of the body are front and rear non-rotatable wheeled axles 20 and 22 respectively, the connection of the underframe to these axles being by a suitable linkage, such, for example, as that shown and hereinafter more fully described, joining pairs of points in the member 16 and on the axles which are located toward the ends of said parts remote from the center line of the vehicle, which linkage coordinates the parts in such a manner that a pressure exerted on one end of the transverse member 16, as by pressing on one end of the pusher bar 12, will cause a cramping movement of at least one axle to steer the vehicle in the desired direction.

Herein the member 16 is connected to the rear axle 22 by crossed links 24 and to the front axle 20 by open or uncrossed links 26, which may be parallel or nearly so, these herein being formed as the end portions of one-piece longitudinal reaches pivoted at their middle portions on the vertical pivots 28 adjacent the ends of the cross member, these pivots constituting the common end pivot of both the crossed and the open pairs of links. In the present instance the unitary rigid relation of the corresponding elements of each pair of links connects the axles and member 16 in such manner as to enforce the desired steering movement.

The steering in the arrangement shown is primarily through the rear wheels in a manner somewhat analogous to the action of a rudder. Referring to Fig. 1 (which it should be recalled is a bottom plan or worm's-eye view so that right and left are reversed), if it is desired to make a turn to the right, that is, to the left viewing the figure, pressure is exerted on the end of pusher bar 12 at the outside of the turn, that is, on the right-hand side in the figure. This tends to swing the bar and the member 16 counterclockwise viewing the figure. The result is to swing the rear axle 22 clockwise, as shown in Fig. 2, to make the turn.

I have above referred to the links 26 as substantially parallel. In the drawings they diverge slightly from the central member 16 to the front axle 20. This causes a slight movement of the front wheels in the direction of the turn. The slight resultant tendency of the linkage to bind is compensated for by providing, as best seen in Fig. 3, a slight clearance in one of the parts for the pivots 28. This figure also shows that pivots 28 pass through the arcuate braces 18 to connect the latter to cross-member 16. An extended bearing for the pivot is thus provided.

The arrangements described provide a very desirable tracking relation of the pairs of wheels during the turn.

To limit the movement of the linkage I here show a U-shaped strap 30 connected to one of the crossed links 24, the strap embracing the companion link. The arms of the U thus form abutments for the sides of the latter link, limiting their relative movement in the manner illustrated in Fig. 2.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A baby carriage or the like comprising a body-supporting underframe including a centrally disposed member extending transversely beneath the body, wheeled non-rotatable axles at front and rear respectively, and means for supporting said member and through it said body from said axles comprising longitudinal reaches pivoted for movement in a horizontal plane at points adjacent the ends of the member and of the axles and extending substantially parallel between one axle and the member and being crossed between the member and the other axle.

2. A baby carriage or the like comprising a body-supporting underframe including a centrally disposed member extending transversely beneath the body, wheeled non-rotatable axles at front and rear respectively, and means for supporting said member and through it said body from said axles comprising longitudinal reaches pivoted for movement in a horizontal plane at points adjacent the ends of the member and of the axles and diverging from said member to the front axle and crossed between said member and the rear axle.

3. A baby carriage or the like comprising a body-supporting underframe including a centrally disposed member extending transversely beneath the body, wheeled non-rotatable axles at front and rear respectively, and a linkwork operating substantially in a horizontal plane connecting the member and axles for coordinated and mutually enforced movements, said linkage comprising the sole supporting connection of said axles with the underframe and body and comprising crossed links between one axle and the member and uncrossed links between the member and the other axle.

4. A baby carriage or the like comprising a body-supporting underframe including a centrally disposed member extending transversely beneath the body, wheeled non-rotatable axles at front and rear respectively, and a linkwork operating substantially in a horizontal plane connecting the member and axles for coordinated and mutually enforced movements, said linkage comprising the sole supporting connection of said axles with the underframe and body and comprising crossed links between one axle and the member and uncrossed links between the member and the other axle, one of the crossed links having abutments adjacent their point of crossing to engage the sides of the other link to limit the relative movements thereof.

EDOUARD LACHANCE.